Patented Apr. 20, 1943

2,316,866

UNITED STATES PATENT OFFICE 2,316,866

METHOD OF PREPARING CELLULOSE ESTERS

Gordon D. Hiatt and Loring W. Blanchard, Jr., Rochester, N. Y., assignors to Eastman Kodak Company, Rochester, N. Y., a corporation of New Jersey No Drawing. Application April 16, 1941, Serial No. 388,836

8 Claims. (Cl. 260—229)

This invention relates to a process for the production of cellulose esters of lower aliphatic acids in which the cellulose is pretreated with a liquid containing nitromethane in substantial amount. Also, the nitromethane carries over and acts as a solvent in the esterification of the cellulose.

In the esterification of cellulose it is advantageous to activate the cotton linters or other cellulose employed. The best agents known up to the present time for activating cellulose are water, aqueous alkali and acetic acid. If, however, water is used for activating the cellulose, it must either be removed before the esterification or an added amount of anhydride must be employed to chemically combine with the water which is present. If alkali is employed for activating the cellulose, it must be removed after the pretreatment because it is not inert to the reagents employed for the esterification of cellulose. Acetic acid, when employed for activating the cellulose, need not be removed; however, the cellulose activated therewith will yield an ester containing a substantial amount of combined acetyl. Therefore, in the preparation of cellulose esters in which the absence of acetyl or only a small amount of acetyl is desired, either all or a considerable portion of the acetic acid used in the pretreatment should be replaced by some other activating agent or else the proportion of groups, other than acetyl in the esterification bath, should be quite high which does not make for economy in such a process.

One object of our invention is to provide a method of pretreating cellulose in which all or a portion of the acetic acid ordinarily employed in a pretreatment may be dispensed with. Another object of our invention is to provide a method of pretreating cellulose using an activating agent which will not influence the distribution of the acyl content in the cellulose ester prepared therefrom. A further object of our invention is to provide a method of pretreating cellulose employing a pretreating agent which need not be removed from the cellulose prior to its esterification. Other objects will appear herein.

We have found that cellulose may be pretreated with nitromethane and the resulting cellulose may be esterified, if desired, without any or only a small acetyl content in the resulting product. We have found that the cellulose, when treated with nitromethane, is activated so that it is much more susceptible to the action of an esterifying agent than without this treatment. We have found that cellulose may be activated with nitromethane and the nitromethane also exerts a solvent action in the esterification reaction. We have found that by the use of nitromethane for pretreating the cellulose, acid anhydride is not consumed thereby. Also, the proportion of combined acyl in the cellulose ester prepared therefrom is not affected by the nitromethane and the nitromethane so activates the cotton linters or other cellulose that the more sluggish esterifying agents, such as butyric anhydride, or the even more sluggish crotonic anhydrides will esterify the cellulose so activated.

In the pretreatment of cellulose with nitromethane, either all or a part of the acetic acid ordinarily employed for pretreating cellulose may be dispensed with. For instance, cellulose esters have been prepared in which nitromethane was the only activating agent used and yet products of good character have been obtained. Also, cellulose esters have been prepared in which the cellulose has been treated with proportions of nitromethane from 100% down to 10% of nitromethane, the other constituent being acetic acid and good cellulose esters have been prepared, although in the latter case the resulting product had an acetyl content depending upon the amount of acetic acid employed in the pretreatment which in turn influenced the proportion of acetyl to high acyl in the resulting product. For the preparation of cellulose esters in which a high content of acyls having more carbon atoms than acetyl, it is desirable to use an activating liquid containing at least 60% of nitromethane in order to keep the amount of acetyl low in the esterification bath. This depends, however, on the desire of the individual operator.

In pretreating cellulose with a nitromethane pretreating liquid, the amount of liquid used may be as much as desired. However, reasons of economy ordinarily limit the amount of pretreating liquid to not more than 5 parts of liquid per part of cellulose. In order to get a good mixing with a pretreatment liquid, at least 3 parts of liquid are ordinarily employed, although with good mixing and thorough incorporation of the pretreatment liquid in the cellulose, at least 2 parts of pretreating liquid have been found to be satisfactory in various cases. The only disadvantage with the smaller amounts of liquid is that a strain is put upon the mixing apparatus.

If a more intensive pretreatment of the cellulose is desired a small proportion of acylation catalyst may be employed in the pretreatment either with the nitromethane or with a mixture of nitromethane and acetic acid. For instance a proportion of catalyst up to 5% based on the cellulose may be employed. If a still more intensive pretreatment is desired larger proportions of catalyst may be employed therein however an increase in the amount of catalyst in the pretreatment increases the danger of derogatorily affecting the cellulose thus introducing difficulty in carrying out this step. Catalysts which may be employed are for example, sulfuric acid, zinc chloride or phosphoric acid. As sulfuric acid has limited solubility in nitromethane, it is desirable to use some acetic acid therewith where a substantial proportion of sulfuric acid is used to promote compatibility.

Although the pretreatment temperature ordinarily found to be satisfactory is approximately 100° F., any usual pretreatment temperature may be used. For instance, pretreating in the complete absence of sulfuric acid, any pretreatment temperature within the range of 100-130° F. is useful for carrying out the pretreatment. If a shortening of the pretreatment time is desired, temperatures above 130° F., such as up to 150 or 160° F., may be employed. In pretreatment processes in which a small amount of sulfuric acid is present, the pretreatment temperatures need not be quite as high. For instance, pretreatment temperatures from 70 up to 100° F. have been found to be suitable for pretreating cellulose in accordance with our invention. The time of treatment will be optional with the operator. Obviously even though the treatment lasts for only 1 hour the cellulose will be more reactive than before treatment.

As pointed out above, our invention is particularly adapted to preparing the cellulose esters of the lower aliphatic acids. For instance, anyone desiring to prepare a butyric acid ester of cellulose, having a high butyryl content, would keep the proportion of acetyl low in the esterification mixture. This can be done nicely in accordance with our invention because acetic acid is in smaller proportion than is ordinarily the case. The cellulose esters, which it is preferred to prepare by our process, are those of the aliphatic acids of 2–4 carbon atoms. For instance, to prepare straight cellulose crotonate it will be desirable to employ a pretreatment without acetyl being present, and therefore our pretreatment process may be utilized.

The following examples are listed to further illustrate our application:

Example I 10 grams of cotton linters were mixed with 40 grams of nitromethane at 110° F. for 15 hours. The mass was cooled and 40 grams of butyric anhydride was incorporated therein. A solution of .4 cc. of 95% sulfuric acid in 2 cc. of butyric acid was mixed therein. The temperature was allowed to rise to 115° F. over a period of 5 hours. A clear, light yellow dope of the cellulose ester resulted.

Example II 4 lbs. of cotton linters was mixed with 3.3 lbs. of nitromethane at 130° F. for 4 hours. The mass was cooled to 50° F. with the addition of 13 lbs. of butyric anhydride. 40 cc. of 95% sulfuric acid in 1.7 lbs. of butyric acid was stirred into the mass in two portions. The temperature was allowed to rise to 75° F. over a period of 10½ hours. A uniform, light yellow dope of the cellulose ester was obtained. The mass was diluted and then precipitated into water.

Example III 10 gram samples of cotton linters were treated for 15 hours at 110° F. with the mixtures as given in the table. 40 grams of butyric anhydride was then added with cooling and .4 cc. of 95% sulfuric acid was added and the temperature was allowed to rise slowly to 100° F. The attached table also gives the actyl and butyryl contents of the products obtained.

| Sample | Nitromethane | Acetic acid | Combined | |
|---|---|---|---|---|
| | | | Acetyl | Butyryl |
| | Grams | Grams | Percent | Percent |
| 1 | 30 | 0 | 0.4 | 56.5 |
| 2 | 29 | 1 | 2.1 | 54.5 |
| 3 | 27 | 3 | 4.5 | 51.6 |
| 4 | 25 | 5 | 7.4 | 47.5 |
| 5 | 20 | 10 | 12.6 | 41.1 |
| 6 | 10 | 20 | 20.8 | 28.9 |

Example IV 10 grams of linters was mixed together with 30 grams of nitromethane at 104° F. for 15 hours. 40 grams of crotonic anhydride was added thereto and the mass was cooled. .4 cc. of sulfuric acid, dissolved in 5 cc. of crotonic anhydride, was added to the mass and the temperature was allowed to rise to 102° F. over a period of 7 hours. An opaque, light yellow dope, containing some fiber, was obtained.

Example V 50 grams of cotton linters was mixed together with 175 grams of acetic acid, 175 grams of nitromethane and .5 cc. of 95% sulfuric acid at 70° F. for 15 hours. The mass was cooled and 150 grams of acetic anhydride was added thereto. The reaction was allowed to take place for 1½ to 2 hours whereupon a good dope was obtained.

Example VI 10 gram samples of cotton linters were treated for 15 hours at 104° F. with mixtures of nitromethane and acetic acid, as shown by the following table:

| | Cotton | $CH_3NO_2$ | HAc | Appearance |
|---|---|---|---|---|
| | Grams | Grams | Grams | |
| 1 | 10 | 29 | 1 | Some haze. |
| 2 | 10 | 27 | 3 | Good dope. |
| 3 | 10 | 25 | 5 | Do. |
| 4 | 10 | 20 | 10 | Fair dope. |
| 5 | 10 | 10 | 20 | Grainy dope. |

The mass was cooled and 30 grams of acetic anhydride was mixed in followed by the mixing in of .4 cc. or 95% sulfuric acid in 40 cc. of acetic acid. The outside temperature was raised from 60 to 110° F. over a period of 7.5 hours. In each case the cellulose was satisfactorily acetylated.

In pretreating cellulose with nitromethane or mixtures of nitromethane and acetic acid, as much pretreatment solution as desired may be employed. It is usually necessary to employ at least as much of the pretreating liquid as of the cellulose as otherwise the mixer in which the pretreatment is carried out is strained. It is desirable to ordinarily employ at least 2 parts of pretreating liquid per part of cellulose. However, as the proportion of liquid to cellulose decreases, the difficulty in stirring increases. The maximum amount of pretreating liquid to employ is governed only by the economy of operating the process.

We claim:

1. A process of preparing cellulose esters which comprises pretreating cellulose with nitromethane and subsequently acylating the cellulose with the anhydride of an aliphatic acid of 2-4 carbon atoms.

2. In the process of preparing lower aliphatic acid esters of cellulose in which the cellulose is pretreated and then acylated with the anhydride of an aliphatic acid of 2-4 carbon atoms, the pretreatment method which comprises contacting cellulose with nitromethane for a time.

3. A process of preparing a butyric acid ester of cellulose which comprises pretreating cellulose with nitromethane and then butyrating the cellulose.

4. A process of activating cellulose to prepare it for acylation which comprises pretreating the cellulose with nitromethane.

5. A process of activating cellulose to prepare it for acylation which comprises pretreating the cellulose with nitromethane solely.

6. A process of activating cellulose to prepare it for acylation which comprises pretreating it with a mixture of nitromethane and acetic acid.

7. A process of preparing cellulose esters which comprises pretreating cellulose with nitromethane plus a portion of the esterification catalyst and subsequently acylating the pretreated cellulose with the anhydride of an aliphatic acid of 2-4 carbon atoms.

8. A process of preparing cellulose esters which comprises pretreating cellulose with a mixture of nitromethane and acetic acid containing a portion of the esterification catalyst and subsequently acylating the so-treated cellulose with the anhydride of an aliphatic acid of 2-4 carbon atoms.

GORDON D. HIATT.
LORING W. BLANCHARD, JR.